United States Patent
Ichimaru

(10) Patent No.: US 6,510,662 B2
(45) Date of Patent: Jan. 28, 2003

(54) MOLDING HOLDER

(75) Inventor: Takahide Ichimaru, Sagamihara (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/892,896

(22) Filed: Jun. 28, 2001

(65) Prior Publication Data

US 2002/0043600 A1 Apr. 18, 2002

(30) Foreign Application Priority Data

Jul. 13, 2000 (JP) ........................................ 2000-212369

(51) Int. Cl.⁷ ............................ E06B 3/988; E06B 7/00; E04C 2/38
(52) U.S. Cl. ................ 52/204.7; 52/204.71; 52/204.72; 52/716.5; 52/716.6; 52/716.7
(58) Field of Search .......................... 52/204.7, 204.71, 52/204.72, 716.5, 716.6, 716.7, 204.69, 204.62

(56) References Cited

U.S. PATENT DOCUMENTS

| | | | |
|---|---|---|---|
| 3,155,204 A | * | 11/1964 | Campbell |
| 3,373,539 A | * | 3/1968 | Meyer |
| 4,011,635 A | * | 3/1977 | Meyer |
| 4,135,277 A | * | 1/1979 | Taniai |
| 4,139,971 A | * | 2/1979 | Kimura |
| 4,161,851 A | * | 7/1979 | Inamoto |
| 4,172,000 A | * | 10/1979 | Horike |
| 4,249,356 A | * | 2/1981 | Noso |
| 4,349,993 A | * | 9/1982 | Tanaka |
| 4,393,560 A | * | 7/1983 | Kato |
| 4,412,406 A | * | 11/1983 | Sengoku |
| 4,698,882 A | * | 10/1987 | Lang |
| 5,107,646 A | * | 4/1992 | Tamura |
| 5,176,420 A | * | 1/1993 | Kato |

FOREIGN PATENT DOCUMENTS

| | | |
|---|---|---|
| GB | 2 037 354 | 10/1978 |
| GB | 2 010 369 | 6/1979 |
| GB | 2 047 785 | 12/1980 |
| GB | 2 079 357 | 1/1982 |
| JP | 55-16732 | 4/1980 |

* cited by examiner

Primary Examiner—Carl D. Friedman
Assistant Examiner—Kevin McDermott
(74) Attorney, Agent, or Firm—Kanesaka & Takeuchi

(57) ABSTRACT

An article holder includes a base to be attached to an inner side portion of a frame and at lease two clip members to be assembled to the base with a space therebetween. The clip members receive therein engaging projections of projecting pieces provided at an article while elastically expanding. Also, the clip members include inserting portions having engaging portions to be engaged with the engaging projections of the projecting pieces through rebounding at terminal positions to which the projecting pieces are inserted. Moreover, the clip members are rotatably assembled to the base. Thus, in case a window glass is curved to have a curved inner side on a passenger's compartment side, the article can be held corresponding to the curve by changing the engaging positions of a plurality of engaging portions with respect to the article.

6 Claims, 10 Drawing Sheets

MOLDING HOLDER

BACKGROUND OF THE INVENTION AND THE RELATED ART STATEMENT

The invention relates to an improvement of a holder for holding an article, such as a molded material or molding (hereinafter simply referred to as "article") to be attached to each of inner sides facing an interior of window frames in a vertical direction among frames surrounding a window of an automobile, and then attached along edge portions in the vertical direction of a window glass to be fitted into the window.

There has been known a holder H, having a structure as shown in FIG. 11, for holding an article M to be attached along each of edge portions in a vertical direction of a window glass to thereby cover, from the outside of an automobile, a space between each of the edge portions in the vertical direction of the window glass to be fitted into a window, to which a front window glass or a rear window glass is fitted, of the automobile and each of inner side portions Fa of frames F in a vertical direction of the automobile among frames constituting the window of the automobile.

The holder H includes a belt-like base 200 to be fixed to the inner side portion Fa of the frame F and a plurality of clips 300 disposed on a side opposite to a side of the base 200 to be fixed to the inner side portion Fa of the frame F with a space therebetween.

In the holder H as described above, an engaging portion Ma disposed on a back surface side of the article M is engaged with engaging claws 301 of the clips 300 so that the article M set along the edge portion in the vertical direction of the window glass can be held.

However, in case the window glass to be fitted into the window of the automobile is curved to have a curved inner side on a passenger's compartment side In in the vertical direction of the automobile, the article M to be attached to cover the space between the edge in the vertical direction of the window glass and the inner side portion Fa of the frame F is also curved and attached to a curved inner side on the passenger's compartment side In. When the article M is curved as described above, the engaging portion Ma formed on the back surface side of the article M is not positioned on the same plane. Thus, in order to properly hold the article M to be attached in the curved state as described above by the conventional holder H, the holder H has to be structured such that attaching positions of the plural clips 300 to the base 200 are set corresponding to the curve so that the engaging claws 301 of the clips 300 provided to the base 200 are partly engaged with the engaging portion Ma of the article M over the lengthwise direction of the article M, respectively.

Thus, it has been difficult that the conventional holder H with this structure is commonly used for holding the articles M to be attached to various types of automobiles.

Also, in the conventional holder H, since the clips 300 are simply attached to the base 200, in case the curvatures in the vertical direction of the window glass of the automobile are not the same, for example, the curvature on a lower side of the window glass is large and becomes gradually smaller toward an upper side, a directional requirement is inevitably accompanied when the holder H structured to set the attaching positions of the plural clips 300 to the base 200 corresponding to the curve is attached to the frame F. Thus, in the conventional holder H, even in case the articles M to be attached to the same type of automobiles are held, the holder H for holding the article M to be attached along one edge on one side of the window glass can not be used for holding the article M to be attached along the other edge on the other side of the window glass.

In view of the above defects, the present invention has been made, and an object of the invention is to solve the disadvantages of the conventional technique, wherein, especially, even in case a window glass, edge portions in vertical direction of which are framed by the articles of this type, is curved to have a curved inner side on the passenger's compartment side, engaging positions of a plurality of engaging portions with respect to the article are changed to hold the article corresponding to the curve, so that articles for plural kinds of automobiles can be held by holders having the same structure without problems, and also, the articles for framing both edges in the vertical direction of the window glass of the same automobile can be held without any problem by the holders of the same structure.

Further objects and advantages of the invention will be apparent from the following description of the invention.

SUMMARY OF THE INVENTION

In order to attain the above objects, according to a first aspect of the invention, an article holder includes the following structures (1) to (5):

(1) a holder for holding an article to be attached along each edge portion, in a vertical direction, of a window glass to be fitted into a window by attaching to an inner side portion directed to an inner side of the window of each frame in a vertical direction of an automobile for forming the window of the automobile;

(2) the holder including a base in a belt-like shape having an attaching surface on one surface thereof to be attached to the inner side portion of the frame;

(3) at least two clip members with a space therebetween in a lengthwise direction of the base on a surface side opposite to the attaching surface of the base;

(4) each of the at least two clip members including inserting portions for receiving therein projecting pieces having engaging projections provided on a back surface side of the article while elastically expanding as the article is attached and having engaging portions to engage the engaging projections of the projection pieces by rebounding at terminal positions to which the projection pieces are received; and (5) each of the at least two clip members being rotatably assembled to the base to have a rotating axis in a direction crossing the surface of the base.

According to the structure, the inserting portions of each clip member of the holder attached to the frame receive therein the projecting pieces of the article in correspondence with the clip member while elastically expanding as the article is attached, and, at the same time, the inserting portions are elastically rebounded at the receiving terminal positions, so that the engaging portions are engaged with the engaging projections of the projection pieces.

In case the window glass to be fitted into the window of the automobile is curved to have the curved inner side on the passenger's compartment side in the vertical direction of the automobile, the article to be attached to cover the space between the inner side portion of each frame and each edge portion in the vertical direction of the window glass is also attached to have the curved inner side on the passenger's compartment side of the automobile. In case the article is curved as described above, the engaging projections of the respective projecting pieces corresponding to the at least two clip members of the holder and disposed at the back surface sides of the articles are not positioned on the same plane, either. However, according to the holder of the invention, since the at least two clip members are rotatably assembled to the base, respectively, even in case the engaging projections of the respective projecting pieces are not positioned on the same plane, as the projecting pieces are received in the inserting portions, the clip members are rotated according to depths by which the projecting pieces are inserted, so that the engaging projections of the projecting pieces can always be properly engaged with the engaging portions of the inserting portions.

As a result, according to the holder of the invention, by simply attaching the holder to the inner side portion of the frame, the article to be attached in a curved state can be properly held.

Also, in case curvatures in the vertical direction of the window glass of the automobile are not uniform in the upper and lower portions, for example, the curvature is large on a lower side of the window glass and is gradually reduced toward an upper side, one article to be attached along one edge portion in the vertical direction of the window glass and the other article to be attached along the other edge portion in the vertical direction of the window glass are held by the holders having the same structure without any problem. More specifically, since the clip members are rotatably assembled to the base, when the holder is attached to the inner side portion of the frame, there is no directional requirement such that either end of the base may be attached to the frame as an upper side. Thus, the articles attached to the edge portions on both sides of the window glass having non-uniform curvatures can be properly held by the holders having the same structure.

According to a second aspect of the invention, the inserting portion of the article holder of the first aspect includes a pair of holding parts for receiving therein the projecting piece having the engaging projection while elastically expanding as the article is set, and the engaging portion provided at at least one side of the pair of the holding parts to engage the engaging projection of the projecting piece by the rebounded force of the holding parts at a terminal position of receiving the projecting piece.

According to the structure, each projecting piece of the article provided corresponding to each clip member can be received in a space between the pair of holding parts in the clip member of the holder attached to the frame while elastically expanding the space as the article is attached, and, at the same time, the pair of holding parts are rebounded at the terminal position to which the projecting piece is received between the pair of holding parts to thereby allow the engaging portions of the holding parts to engage the engaging projection of the projecting piece.

In case the window glass to be fitted into the window of the automobile is curved to have the curved inner side on the passenger's compartment side in the vertical direction of the automobile, the article to be attached to close the space between the inner side portion of each frame and each edge portion in the vertical direction of the window glass is also attached to have the curved inner side on the passenger's compartment side of the automobile. In case the article is curved as described above, the engaging projections of the respective projecting pieces disposed to the back surface side of the articles corresponding to the at least two clip members of the holder are not positioned on the same plane, either. However, according to the holder of the invention, since the at least two clip members are rotatably assembled to the base, respectively, even in case the engaging projections of the respective projecting pieces are not positioned on the same plane, as the projecting pieces are received between the pair of holding parts, the clip members are rotated according to the depths by which the projecting pieces are inserted, so that the engaging projections of the projecting pieces can always be properly engaged with the engaging portions of the holding parts.

As a result, according to the holder of the invention, by simply attaching the holder to the inner side portion of the frame, the article to be attached in a curved state can be properly held.

Also, in case curvatures in the vertical direction of the window glass of the automobile are not uniform in the upper and lower portions, for example, the curvature is large on the lower side of the window glass and is gradually reduced toward the upper side, an article to be attached along one edge portion and an article to be attached along the other edge portion in the vertical direction of the window glass are held by the holders having the same structure without any problem. More specifically, since the clip members are rotatably assembled to the base, when the holder attached to the inner side portion of the frame, there is no directional requirement such that either end of the base may be attached to the frame as an upper side. Thus, the articles to be attached along the edge portions on both sides of the window glass having non-uniform curvatures can be properly held by the holders having the same structure.

According to a third aspect of the invention, the base of the article holder described in the first aspect of the invention has a flexibility.

According to the structure as described above, even in case a surface of the inner side portion of the frame to which the holder is attached is curved to have the curved inner side on the inner side of the window, the holder can be properly attached along the inner side portion of the frame in a state where the base is curved to closely attach the attaching surface of the base to the surface of the inner side portion of the frame.

According to a fourth aspect of the invention, the clip member of the article holder as described in the first aspect includes a wobbling stopper which is pressed against the surface of the base in an elastically deformed state.

According to the structure as described above, the article held by the clip member can be held not to wobble in a widthwise direction of the article.

According to a fifth aspect of the invention, the base of the article holder as described in the first aspect of the invention includes a rotation control portion for controlling a rotation area of the clip member by abutting against a part of the clip member on the rotating forward side through rotation of the clip member.

According to the structure, the rotation area of the clip member can be controlled thereby not to rotate the clip member more than necessity.

DETAILED DESCRIPTION OF PREFERRED EMBODIMENTS

Hereunder, an embodiment according to the present invention is explained with reference to FIGS. 1 to 10.

Figure 1:
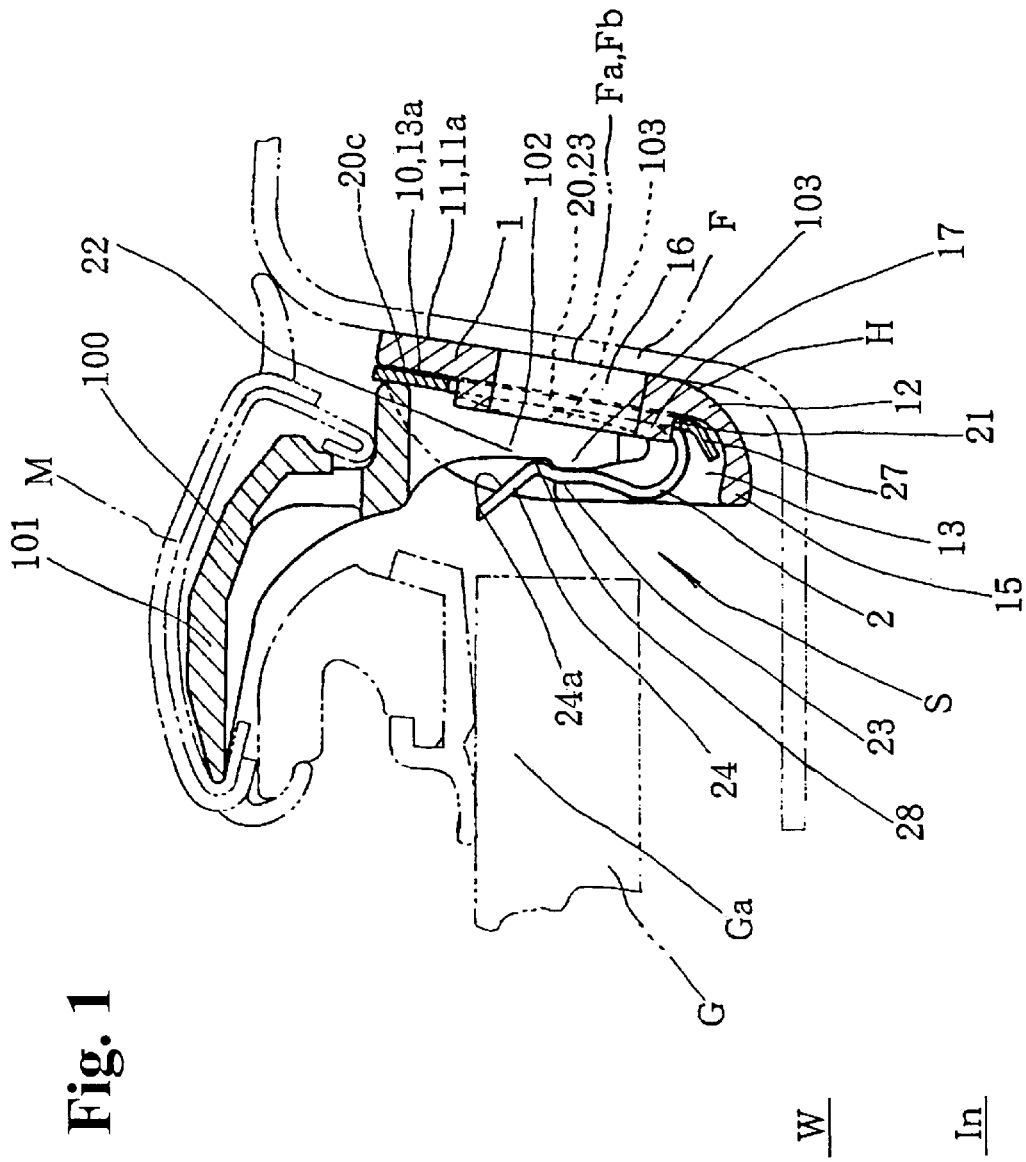
FIG. 1 is a sectional view showing a using state of a holder of an embodiment according to the invention.

Incidentally, FIG. 1 is a sectional view showing a state wherein an article holder H of an embodiment holds an article M set along an edge portion Ga in a vertical direction of a window glass G, and is sectioned along a widthwise direction thereof.

Figure 2:
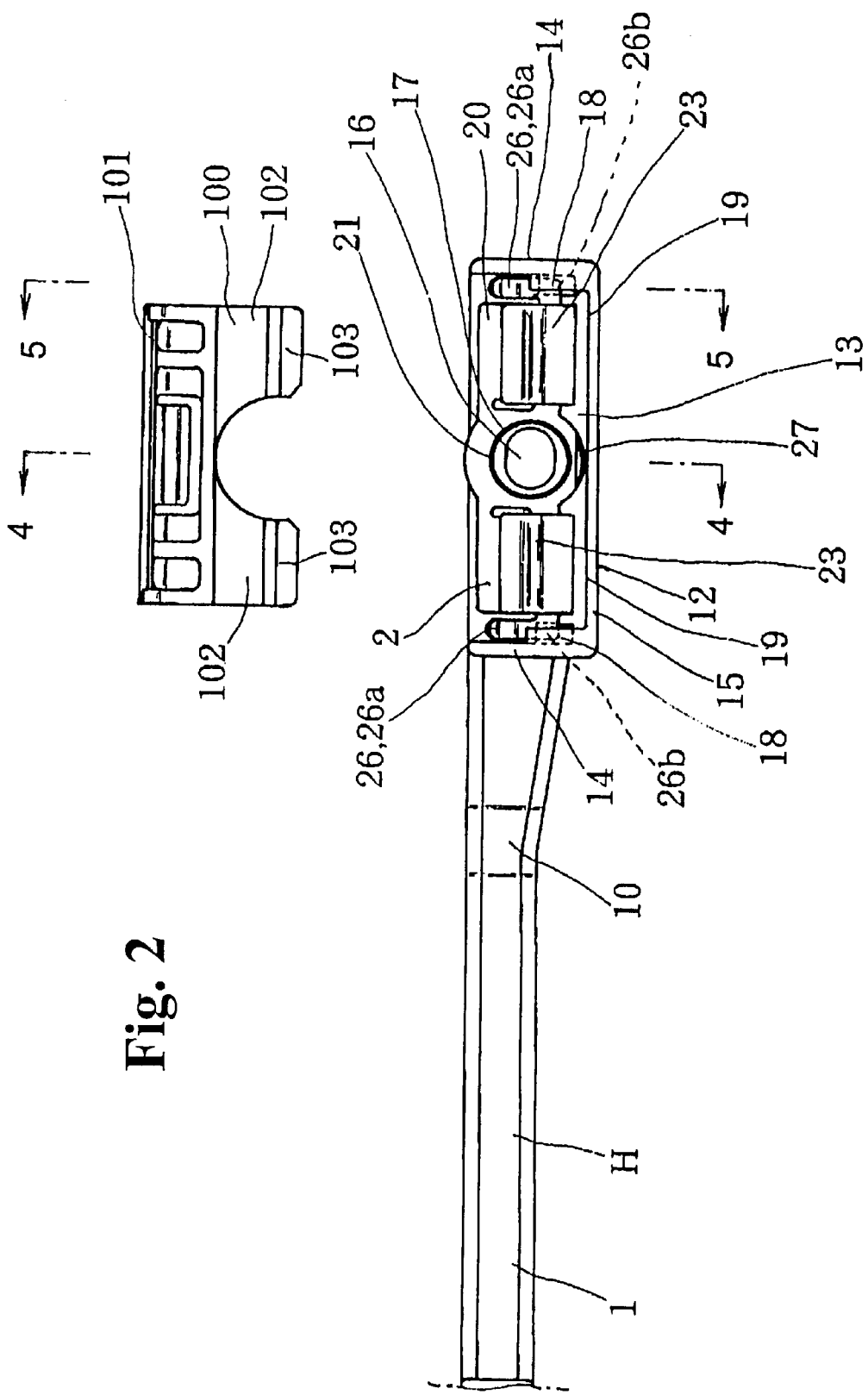
FIG. 2 is a front view of essential parts of the holder.
Figure 3:
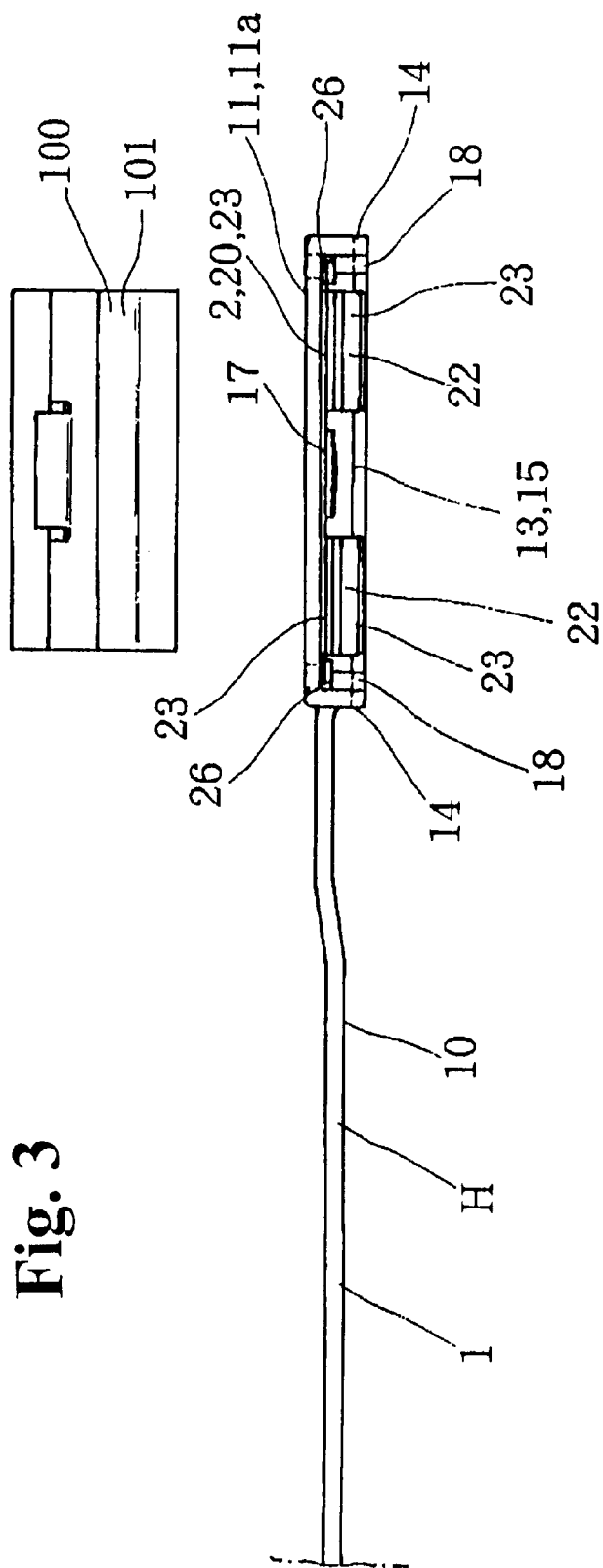
FIG. 3 is a plan view of the essential parts of the holder.
Figure 4:
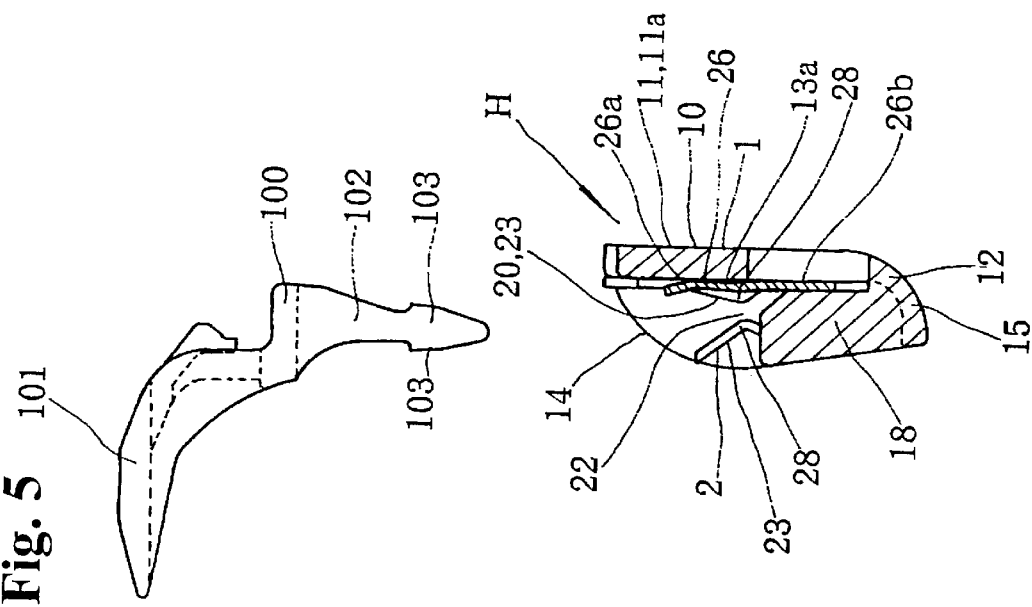
FIG. 4 is a sectional view taken along line 4–4 in FIG. 2.
Figure 5:
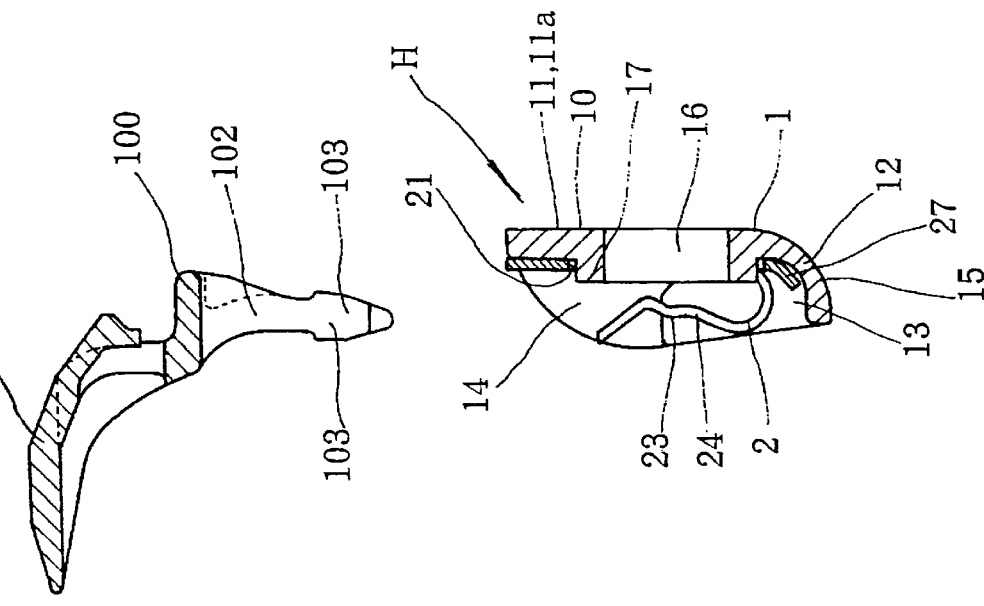
FIG. 5 is a sectional view taken along line 5–5 in FIG. 2.

Also, FIG. 2 shows a state wherein one end side of the holder H is viewed from a side of a surface 10 of a base 1 for constituting the holder H, and FIG. 3 shows a state wherein one end side of the holder H is viewed from an upper side of FIG. 2. Also, FIGS. 4 and 5 are sectional views taken along the widthwise direction at different positions of the holder H, respectively.

Figure 6:
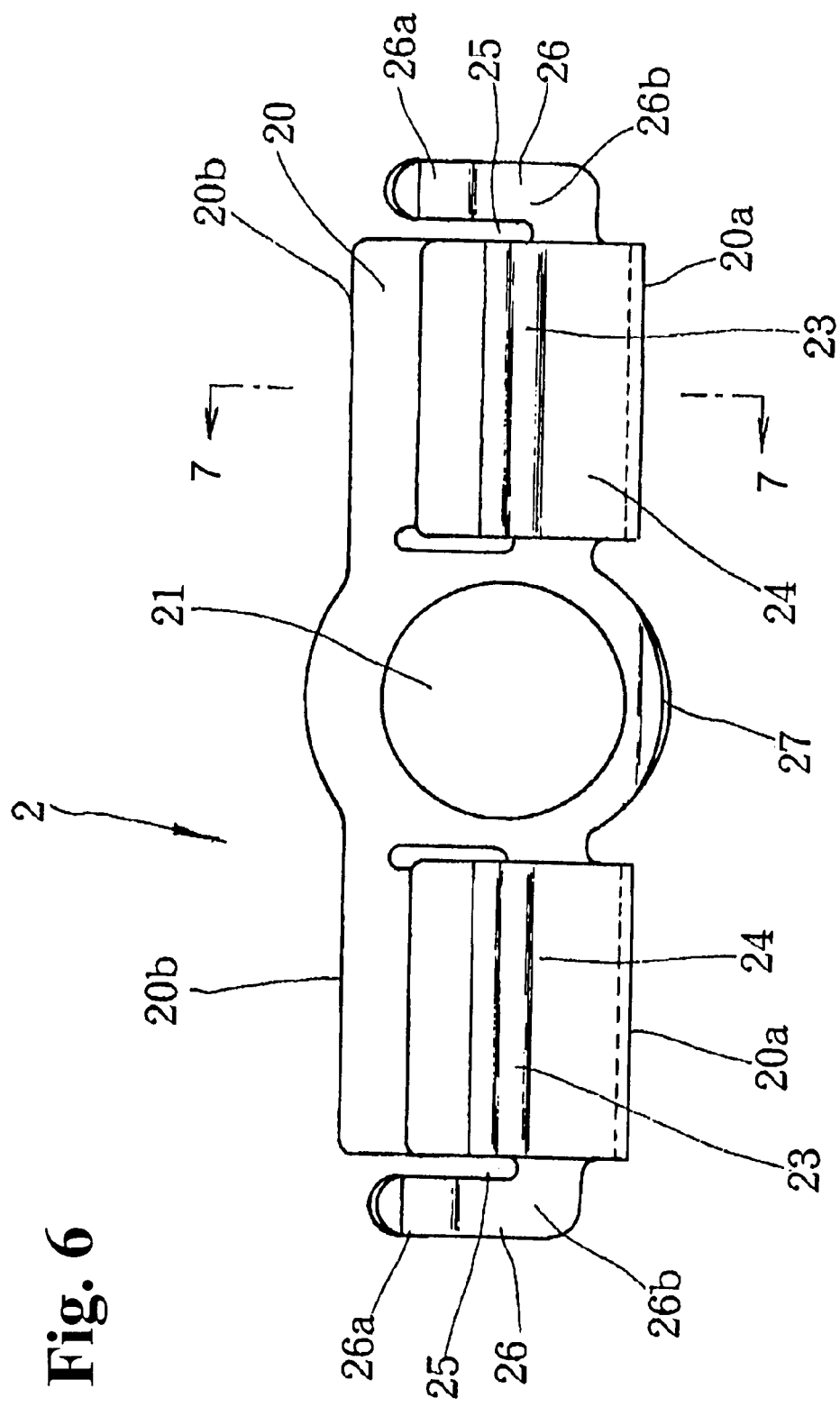
FIG. 6 is a front view of a clip member 2.
Figure 7:
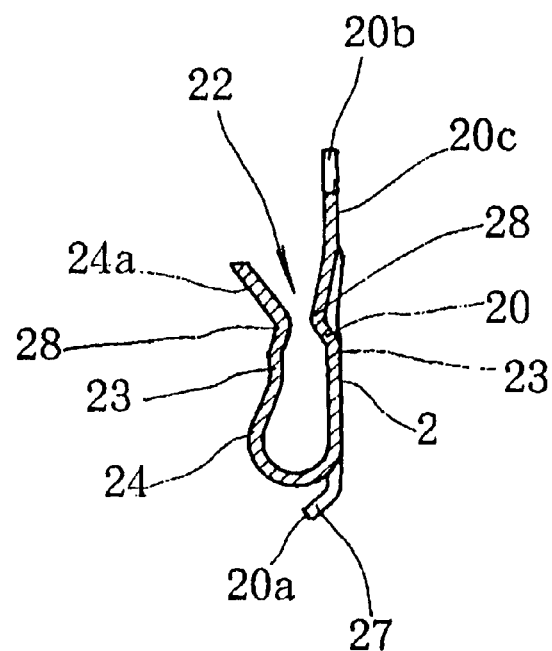
FIG. 7 is a sectional view taken along line 7–7 in FIG. 6.

Also, FIG. 6 is a drawing showing a clip member 2 to be rotatably assembled to the base 1 for constituting the holder H, and FIG. 7 is a sectional view of the clip member 2 taken along a widthwise direction of the clip member 2.

Figure 8:
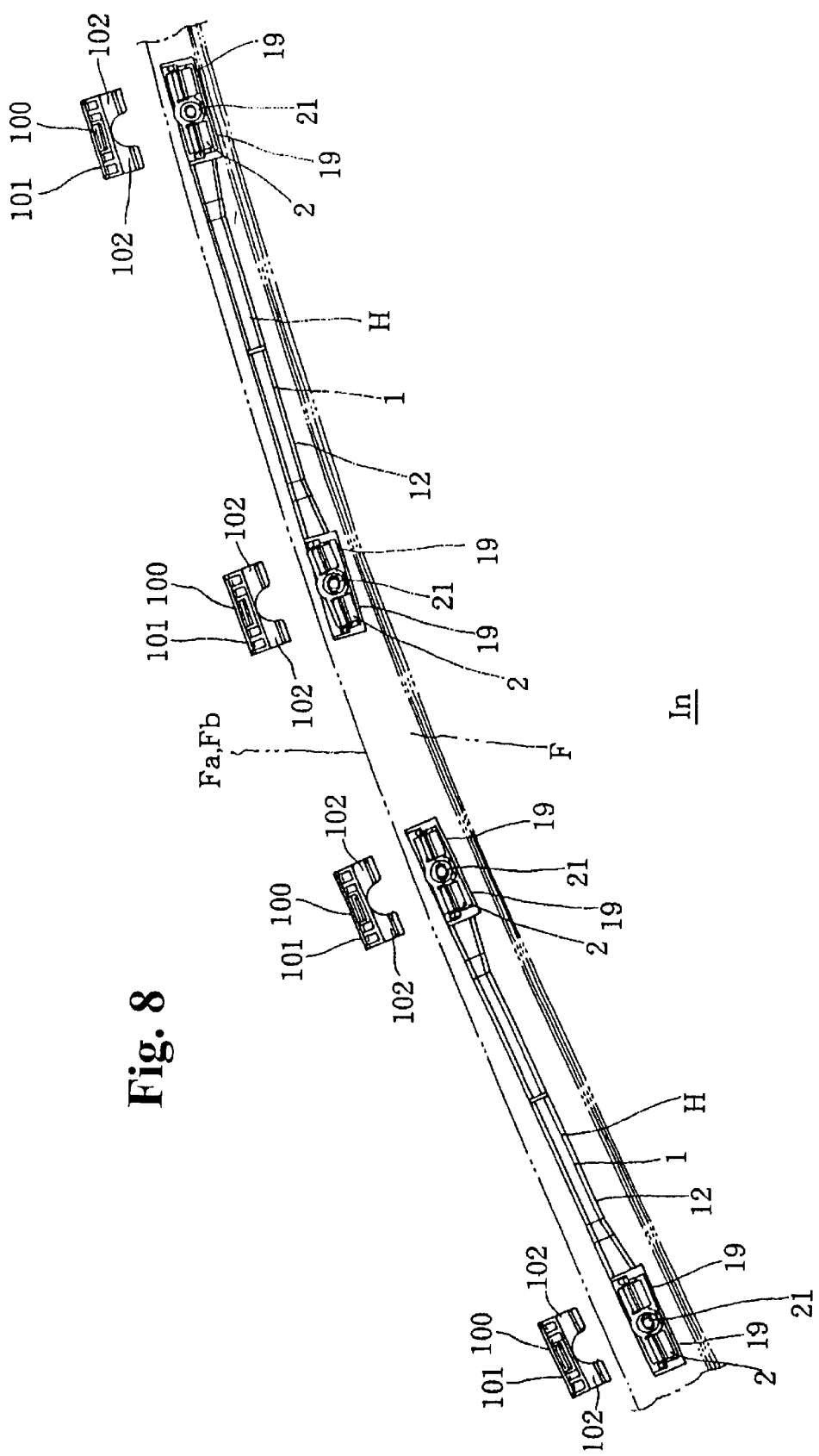
FIG. 8 is a side view showing an attaching state of the holder to an inner side portion of a frame.

FIG. 8 is a drawing showing a state wherein two holders H are attached in an inner side portion Fa of a frame F disposed in a vertical direction of an automobile for constituting a window W of the automobile, and viewed from an inner side of the window W.

Figure 10:
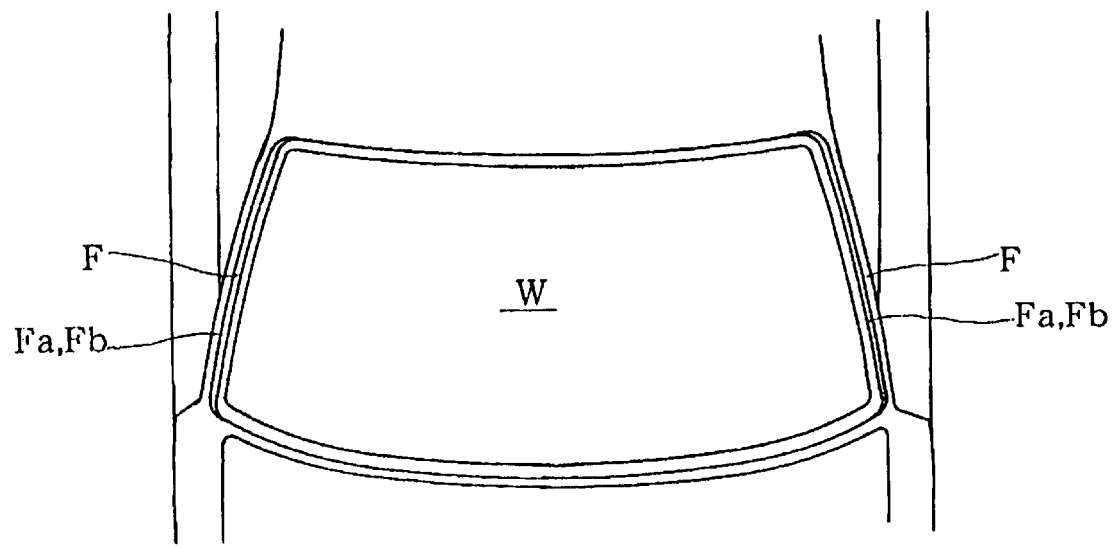
FIG. 10 is a plan view of a body of an automobile.
Figure 11:
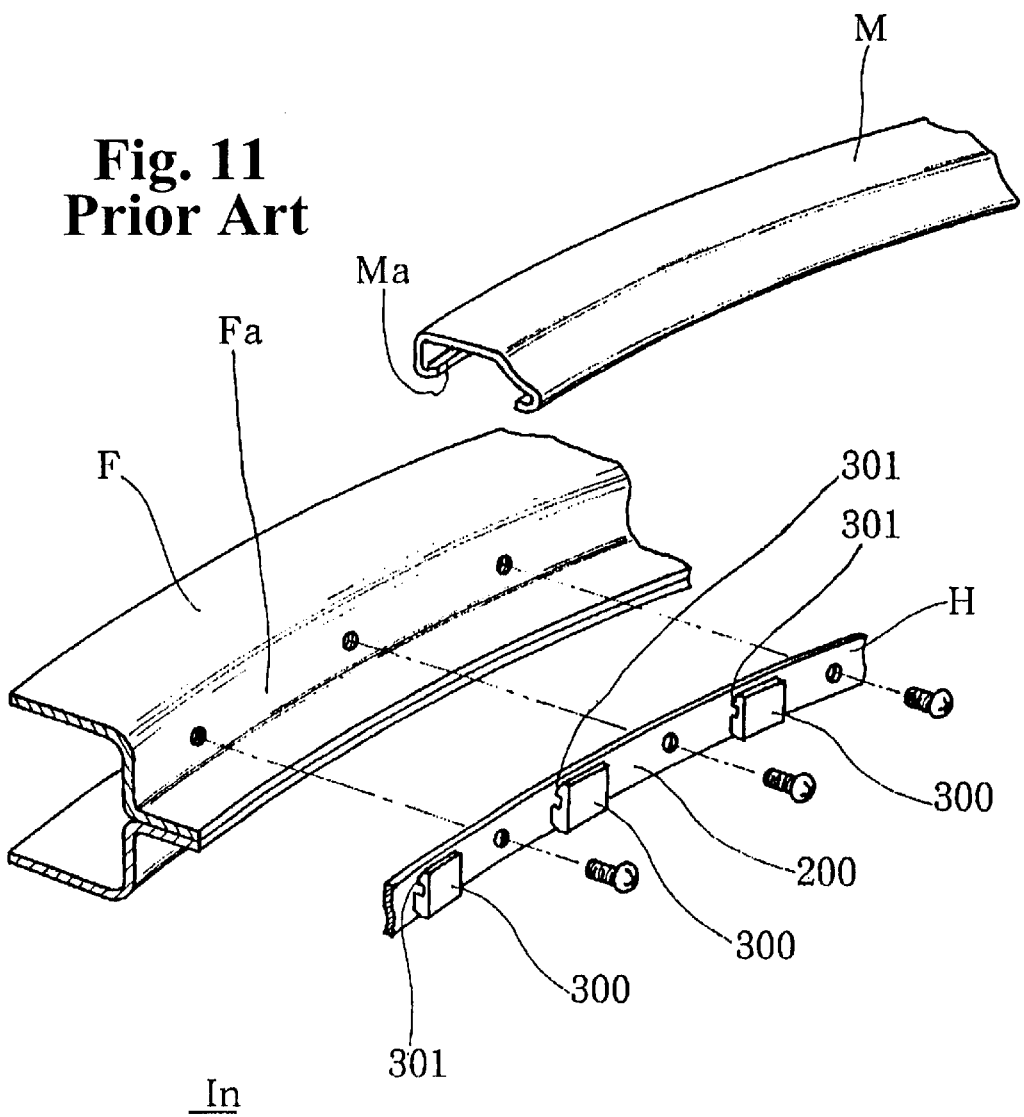
FIG. 11 is an exploded perspective view showing a state where a conventional holder is separated from a frame.

FIG. 10 is a plan view showing a state wherein the window W of the automobile to which a front window glass is to be fitted is viewed from an upper side of the automobile to easily understand a typical position where the holder H is attached. FIG. 10 shows only a car body without the front window glass, article M and holder H.

Incidentally, in FIGS. 2, 3, 4, 5, 8 or 9, there is also shown a mold clip 100 having projecting pieces 102 to be attached to a side of the article M to engage the clip member 2 of the holder H on a back surface side of the article M.

The article holder H of the above embodiment is attached to each of the inner side portions Fa facing an interior of the window W of frames F in a vertical direction of the automobile surrounding the window W for defining the window W of the automobile into which a front window glass or a rear window glass is fitted, and holds the article M along each of edge portions Ga in the vertical direction of the window glass G. A space S between each of the edge portions Ga disposed in the vertical direction of the window glass G to be fitted to the window W and each of the inner side portions Fa of the frames F in the vertical direction of the automobile is covered from an outside of the automobile.

The holder H includes the clip member 2 to be engaged with projecting pieces 102 to be inserted as the article M is set along one of the edge portions Ga in the vertical direction of the window glass G while inserting the projecting pieces 102 into the spaces S. Thus, the article M to be set as described above can be held by one touch.

The holder H includes a base 1 in a belt-like shape having an attaching surface 11a at the inner side portion Fa of the frame F, and at least two clip members 2 with a space therebetween in a longitudinal direction of the base 1 disposed on a surface side opposite to the attaching surface 11a of the base 1. In the embodiment, the clip members 2 are disposed on both ends of the base 1, respectively, so that the holder H is formed of one base 1 and two clip members 2.

The clip member 2, in the embodiment, includes the following structures (1) to (5):

(1) A base plate portion 20 has a slender plate shape provided with an assembling hole 21 at the center thereof;

(2) On each side of the assembling hole 21, a pair of holding parts 23 are formed. The holding parts 23 receive therein the projecting piece 102 having the engaging projection 103 disposed on the back surface side of the article M while elastically expanding as the article M is attached, i.e. set, as described above, and constitutes an inserting portion 22 having engaging portions 28 to be engaged with the engaging projection 103 of the projecting piece 102 by being rebounded at a position where reception of the projecting piece 102 is terminated;

In the embodiment, the base plate portion 20 disposed on the side of the assembling hole 21 constitutes one side of the pair of holding parts 23. The other side of each pair of the holding parts 23 includes a curved plate member 24 extending to a side of an upper edge 20b of the base plate portion 20 by integrally connecting a lower end edge thereof to a lower edge portion 20a, i.e. an edge portion of the base plate portion 20 positioned on a passenger's compartment side In of the automobile when the holder H is attached to the inner side portion Fa of the frame F, of the base plate portion 20 on the side of the assembling hole 21.

(3) The other side of the pair of holding parts 23 constituted as the curved plate member 24 is provided to a side surface opposite to the surface (hereunder, referred to as back surface 20c of the base plate portion 20) facing the surface 10 of the base 1 of the base plate portion 20.

(4) Also, the other side of the pair of holding parts 23 constituted as the curved plate member 24 includes an inclined portion 24a at its forward end inclined to gradually approach the base plate portion 20 from an upper end edge of the holding part 23 to thereby receive the projecting piece 102 provided to the side of the article M between the pair of holding parts 23, and a mountain shape protrusion for forming one engaging portion 28 to engage the engaging projection 103 at a terminal position of the inclined portion 24a, over its widthwise direction. Also, the base plate portion 20 for constituting the one side of the pair of holding parts 23 includes an engaging portion 28 projecting toward the other side of the holding part 23.

(5) Also, in the embodiment, expanding slots 25 opened outward at the upper edge portions 20b and extending toward the lower edge portions 20a of the base plate portion 20 are provided on both ends of the base plate portion 20 in its lengthwise direction, respectively, Both end portions divided by the expanding slots 25 of the base plate portion 20 constitute respective wobbling stop portions 26 in a tongue-like shape pressed against the surface 10 of the base 1 in an elastically deformed state when the clip member 2 is assembled with the base 1. Specifically, in the embodiment, a forward end 26a of each wobbling stop portion 26 is curved so as to slightly project outward from an imaginary surface including the back surface 20c of the base plate portion 20 surrounding the assembling hole 21.

The clip member 2 can be obtained by forming a thin metal plate as described above.

The base 1, in the embodiment, includes the following structures (1) to (5).

(1) The base 1 is formed to have a belt-like shape provided with indented assembling portions 13 for the clip members on both ends on the side of the surface 10 of the base 1.

(2) Each indented assembling portion 13 is formed to be elongated in a lengthwise direction of the base 1. More specifically, in the embodiment, the indented assembling portion 13 is formed, to be indented from the side of the surface 10 of the base 1, by a pair of partition ribs 14 provided in a widthwise direction of the base 1 with a space therebetween having a length slightly longer than that of the clip member 2, and a lower rib 15 extending between the pair of the partition ribs 14 along a lower edge portion 12, i.e. an edge portion of the base 1 positioned in the passenger's compartment side In of the car when the holder H is attached to the inner side portion Fa of the frame F, of the base 1.

(3) Also, an attaching hole 16 for attaching the base 1 to the inner side portion Fa of the frame F is provided at a substantially central portion in the lengthwise direction of the indented assembling portion 13 to penetrate through the same.

(4) Also, an annular rib 17 is formed to surround a hole edge of the attaching hole 16 provided in the indented assembling portion 13. The annular rib 17 has an outer diameter substantially the same as or slightly smaller than an inner diameter of the assembling hole 21 of the clip member 2.

(5) There are also formed holding projections 18 projecting from walls, facing an inner side of the indented assembling portion 13, of the pair of the partition ribs 14 disposed apart from a bottom surface of the indented assembling portion 13 to have a space. In the embodiment, each holding projection 18 is formed to have a length extending from a Substantially middle position of the partition rib 14 in its lengthwise direction to a portion connected to the lower rib 15. Also, in the embodiment, a space between an inner surface of each holding projection 18 and the bottom surface of the indented assembling portion 13 is the same as a space to be elastically deformed of the wobbling stop portion 26. Thus, a surface of the forward end 26a of the wobbling stop portion 26 disposed on the side of the back surface 20c of the base plate portion 20 is elastically pressed against a bottom surface 13a (i.e. the surface 10 of the base 1) of the indented assembling portion 13, in a state where the clip member 2 is assembled to the indented assembling portion 13 to contact an inner surface of the holding projection 18 such that a surface of a base portion 26b of the wobbling stop portion 26 disposed on a surface side of the base portion 20 of the clip member 2 contacts an inner surface of the holding projection 18.

Figure 9:
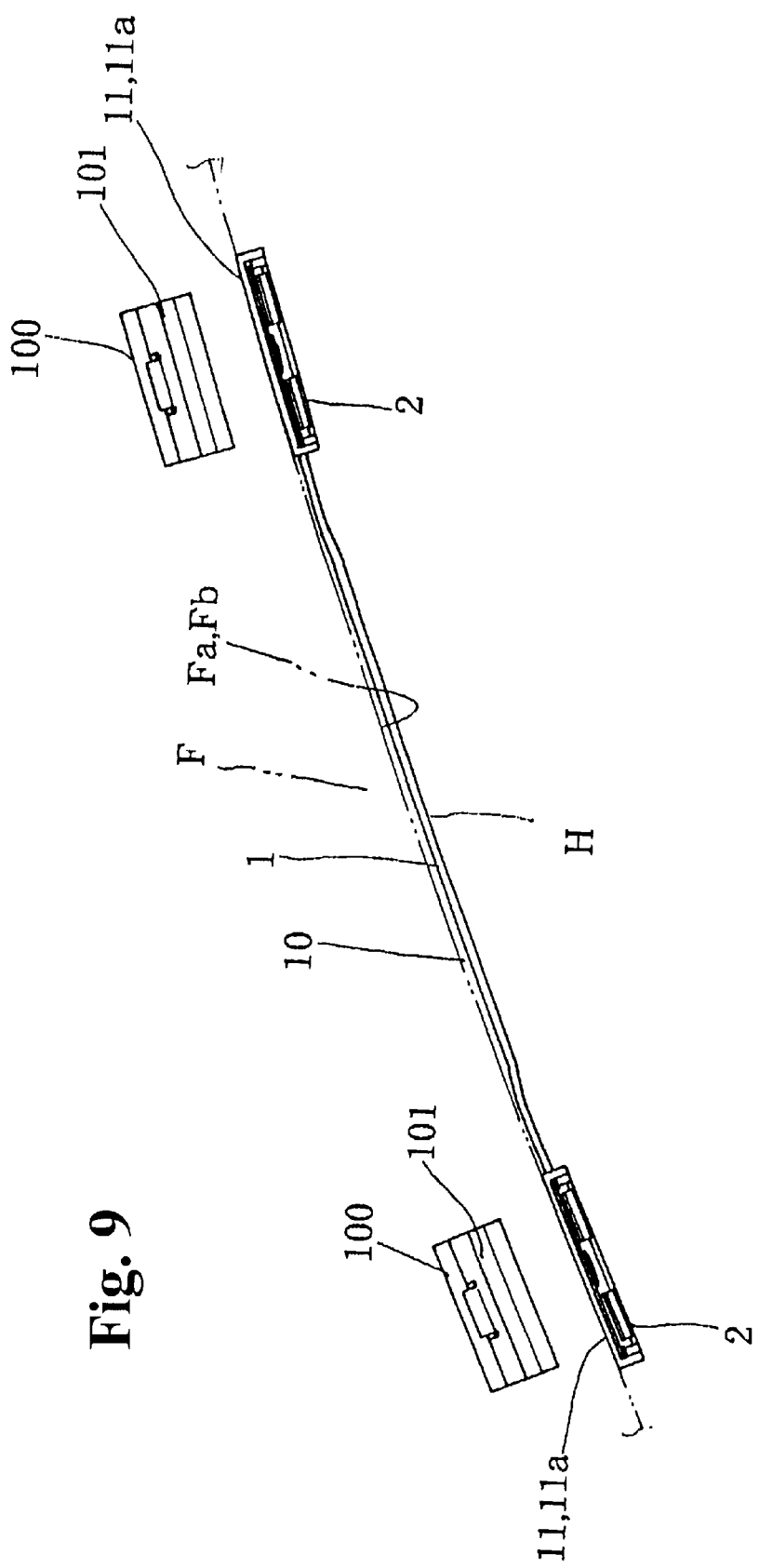
FIG. 9 is a plan view showing an attaching state of the holder to the inner side portion of the frame.

In case the base 1 is provided with a flexibility, i.e. elastic deforming characteristic, even if a surface of the inner side portion Fa of the frame F to which the holder H is attached is curved to have a curved inner side on the inner side of the window W, the holder H can be properly attached along the inner side portion Fa of the frame F in a state where the base 1 is curved so that an attaching surface 11a of the base 1 is closely attached to a surface Fb of the inner side portion Fa of the frame F (Refer to FIG. 9). The flexibility can be provided to the base 1, for example, by a plastic molded product wherein the base 1 is made of a soft plastic material.

In assembling the base 1 and the clip members 2, in the embodiment shown in FIGS. 1 to 9, the two clip members 2 are fitted into the two indented assembling portions 13 of the base 1 having the above described structure, respectively, from a side where the lower rib 15 is not provided to the indented assembling portion 13 such that entrance sides of the pairs of the holding pieces 23 of the clip members 2 are directed to an upper edge side of the base 1 to thereby constitute the holder H.

More specifically, one of the wobbling stop portions 26 of the clip member 2 is inserted into the inner surface side of one of the holding projections 18 in the indented assembling portion 13 of the base 1, and the other of the wobbling stop portions 26 of the clip member 2 is inserted into the inner surface side of the other of the holding projections 18 in the indented assembling portion 13 of the base 1. Also, the clip member 2 is fitted in the indented assembling portion 13 so that the annular rib 17 formed on the hole edge portion of the attaching hole 16 of the base 1 is inserted into the assembling hole 21 of the clip member 2 to thereby assemble the clip member 2 to the base 1.

As described above, the clip member 2 fitted in the indented assembling portion 13 of the base 1 is not extracted forward from the side of the surface 10 of the base 1 since the wobbling stop portion 26 is held between the inner surface of the holding projection 18 and the bottom surface 13a of the indented assembling portion 13.

Also, a back surface side of the thus fitted clip member 2 is not easily moved in a direction apart from the surface 10 of the base 1 since a surface of the forward end portion 26a of the wobbling stop portion 26 is elastically pressed against the bottom surface 13a of the indented assembling portion 13. As a result, the article M held by the clip member 2 can be held in its widthwise direction without wobbling, as described later.

Also, it is difficult to move the thus fitted clip member 2 in a widthwise direction of the base 1 since the annular rib 17 is assembled to the base 1 by inserting the same into the assembling hole 21. As a result, as described later, the article M held by the clip member 2 can be supported not to be moved in a direction apart from a surface of a window glass G.

Also, in the embodiment, spaces are formed between the lower edge portions 20a on both sides of the assembling hole 21 of the base plate portion 20 of the clip member 2 fitted as described above and an inner side surface of the lower rib 15 of the base 1 for constituting the indented assembling portion 13.

As the result, in the embodiment, the clip member 2 fitted as described above can be rotated in a predetermined area while allowing the inner surface of the assembling hole 21 to slidingly contact an outer peripheral surface of the annular rib 17 as a guiding surface.

More specifically, in the embodiment, the respective lower edge portions 20a on both sides of the assembling hole 21 of the base plate portion 20 of the clip member 2 allow the clip member 2 to rotate reciprocally in a state where the clip member 2 is fitted into the base 1 from a standard position having an equal space with respect to the inner surface of the lower rib 15 of the base 1 (position shown in FIG. 2) to a position where either one of the lower edge portions 20a of both sides of the assembling hole 21 contacts the inner surface of the lower rib 15. In the embodiment, since the annular rib 17 is projected from the surface 10 of the base 1, the clip member 2 is rotated along the outer peripheral surface of the annular rib 17 as the guiding surface with a pivot in a direction crossing the surface 10 of the base 1, i.e. direction substantially crossing the surface orthogonally. The clip member 2 is rotated so that one of the both sides of the assembly hole 21 of the clip member 2 is raised upward and the other is lowered downward from the standard position, or one of the both sides of the assembling hole 21 is lowered downward and the other is raised upward from the standard position.

Also, the rotating area of the clip member 2 can be controlled by pressing a part of the clip member 2, i.e., in the present embodiment, the lower edge portions 20a on both sides of the assembling hole 21 of the base plate portion 20, against the inner surface of the lower rib 15 when the clip member 2 is rotated. Thus, the clip member 2 is not rotated beyond necessity. In other words, in the embodiment, the inner surface of the lower rib 15 functions as a rotation controlling portion 19 for controlling the rotation area of the clip member 2.

Incidentally, in the embodiment, the lower edge portions 20a positioned to surround the assembling hole 21 of the clip member 2 are curved to have an inclined surface gradually separating from the side of the surface 10 of the base 1 on a back surface side of the clip member 2. When the clip member 2 is fitted into the indented assembling portion 13 of the base 1 from the side of the upper edge portion of the base 1 by the inclined surface of the curved portion 27, the lower edge portion 20a surrounding the assembling hole 21 can smoothly pass over the annular rib 17 so that the annular rib 17 can easily be inserted into the assembling hole 21.

The holder H having the structure as described above is attached to the frame F such that a longitudinal direction of the base 1 extends along the extending direction of the frame F. In other words, the holder H is attached to the frame F in the vertical direction of the automobile, or in a vertical direction of the window W so that the attaching surface 11a of the base 1 is closely attached to the surface Fb of the inner side portion Fa of the frame F.

In the embodiment, the holder H is attached to the frame F by inserting a shaft-like fastener (not shown), such as a rivet, one end of which is fixed to the frame F, into the attaching hole 16 provided in the indented assembling portion 13 of the base 1 where the annular rib 17 is formed in the peripheral edge thereof, from the side of a back surface of the base 1. In other words, the holder H is attached to the frame F such that the inserted fastener is not extracted from the attaching hole 16.

In case a rivet is used as the shaft-like fastener, the holder H can be attached by clamping the other end of the rivet inserted into the attaching hole 16 so that the other end of the rivet is projected from the side of the surface 10 of the base 1. Incidentally, in the embodiment, since the annular rib 17 is formed such that the projected end of the annular rib 17 inserted into the assembling hole 21 of the clip member 2 is positioned forward from the surface of the clip member 2, even if the rivet is clamped as described above, the clamped portion of the rivet can be prevented from contacting the surface of the clip member 2 to thereby allow rotation of the clip member 2 along the outer peripheral surface of the annular rib 17 as the guiding surface.

More specifically, in the embodiment, the holders H are attached to the frame F by inserting the shaft-like fasteners into the respective attaching holes 16 formed on both ends of the base 1 so that back surfaces 11 of the base 1 at the both end portions thereof are closely attached to the surface Fb of the inner side portion Pa of the frame F.

In an example shown in FIG. 8, two holders H are attached on upper and lower sides of the frame F provided in a vertical direction of the window W of the automobile, respectively.

After the holders H are attached to the inner side Fa of the frame F of the automobile and the window glass G is fitted into a window W formed of the frames F, an article M having the projecting pieces 102 on its back side is set into a space S between the inner side portion Fa of the frame F and an edge portion Ga of the window glass G in its vertical direction from an outside of the automobile so that the projecting pieces 102 are inserted between the respective pairs of holding parts 23 of the clip member 2 of the holder H. Thus, the projecting pieces 102 are engaged with the clip member 2 not to be extracted from the insides of the pairs of the holding parts 23 and the space S is closed by the article M (see FIG. 1).

In the embodiment, two mold clips 100, each having the two projecting pieces 102, with a space therebetween substantially equal to the space between the two clip members 2 of the holder H are attached on a back surface side of the article M to thereby provide the article M with the projecting pieces 102. In the embodiment shown in FIG. 8, since the holders H are attached to the upper side and lower side of the frame F, respectively, the four mold clips 100 are attached to the article M.

Specifically, the mold clip 100 includes a head portion 101 fitted into a depressed portion formed on a back side of the article M, and the pair of leg-shape projecting pieces 102 integrally projecting from the head portion 101. The pair of projecting pieces 102 are formed to have a pitch therebetween corresponding to an interval between the pairs of holding parts 23 formed on both sides of the clip member 2 of the holder H. Also, the engaging projections 103 are formed on both forward ends of the pair of the projecting pieces 102, respectively, and a thickness of the projecting piece 102 at a position where the engaging projection 103 is formed is slightly larger than a space between the engaging portions 28 formed to the pair of holding parts 23.

As a result, in the embodiment, the pair of projecting pieces 102 of the mold clip 100 are inserted between the pairs of holding parts 23 on both sides of each clip member 2 of the holder H attached to the frame F, as described above, while elastically expanding the space between the pair of holding parts 23 as the article M is set. Also, one side of each pair of the holding parts 23 constituted as the curved plate member 24 is elastically rebounded, i.e. elastically returned, at a position where the insertion of the projecting piece 102 is completed between the pair of holding parts 23, i.e. the position (refer to FIG. 1) where the engaging projection 103 of each projecting piece 102 is inserted between the pair of the holding parts 23 beyond the engaging portions 28 thereof, so that the engaging portions 28 formed on the pair of the holding parts 23 can be engaged with the engaging projection 103 of each projecting piece 102.

At this time, in case the window glass G to be fitted into the window W is curved to have a curved inner side on a passenger's compartment side In in a vertical direction of the automobile, the article M to be attached along the edge portion Ga in the vertical direction of the window glass G to cover a space S formed between the edge portion Ga and the inner side portion Fa of the frame F is also attached to have a curved inner side on the side of the passenger's compartment In of the automobile. In case the article M is curved as described above, the engaging projections 103 of the respective projecting pieces 102 corresponding to at least two clip members 2 of the holder H (in the example shown in FIGS. 1 to 9, the two clip members 2 provided at both ends of the holder H) provided to the back surface side of the article M are not positioned on the same plane, either.

However, in the holder H according to the embodiment, since the two clip members 2 are rotatably assembled to the base 1, respectively, and the article M is attached in the curved state, even if the engaging projections 103 of the projecting pieces 102 are not positioned on the same plane, i.e. even if the depths of the projecting pieces 102 inserted into the space S between the edge portion of the window glass G and the inner side portion Fa of the frame F are not the same, as each projecting piece 102 is inserted between the pair of the holding parts 23 of the clip member 2, according to the inserted depth of the projecting piece 102, the clip member 2 is rotated. Thus, the engaging projection 103 of the projecting piece 102 is properly engaged at all times with the engaging portions 28 of the pair of holding parts 23.

As a result, in the holder H according to the embodiment, the article M to be attached in the curved state can be properly held simply by attaching the holder H to the inner side portion Fa of the frame F.

Also, even in case the curvatures of the window glass G of the automobile in its vertical direction are not uniform, for example, even in case the curvature on a lower side of the window glass G is large and the curvatures toward an upper side are gradually reduced, there is a characteristic such that holding of the article M to be attached along the edge portion Ga on one side of the window glass G in its vertical direction and holding of the article M to be attached along the edge portion Ga on the other side of the window glass G in its vertical direction can be carried out by a single holder H of the same structure without any problem (Refer to FIG. 10). More specifically, in the holder H according to the embodiment, since the clip member 2 is rotatably assembled to the base 1, when the base 1 is attached to the inner side portion Fa of the frame F, there is no directional requirement such that either end of the base 1 may be attached to the frame F as an upper side. Thus, the articles M to be attached along the edges on both sides of the window glass G having non-uniform curvatures of the curve can be properly held by the holders H with the same structure.

According to the article holder of the invention, even if the window glass having its edge portions in the vertical direction to be framed by the article is curved to have the curved inner side on the passenger's compartment side, as the article is set, the article can be properly held corresponding to the curve by changing the engaging positions of the engaging portions with respect to the engaging projections of the projection pieces provided on a back side of the article through rotation of the clip member. As a result, according to the article holder of the invention, the articles for framing both edge portions in the vertical direction of the window glass for different types of automobiles as well as the articles for framing both edge portions in the vertical direction of the window glass for the same type of automobile can be held by the holders of the same structure without any problems.

While the invention has been explained with reference to the specific embodiments of the invention, the explanation is illustrative and the invention is limited only by the appended claims.

What is claimed is:

1. An article holder for holding an article to a frame, comprising:
   a base in an elongated shape having an attaching surface on one side thereof to be attached to the frame; and
   at least two clip members rotatably attached to the base on a side opposite to the attaching surface of the base to have a space therebetween in a lengthwise direction thereof, each of said at least two clip members including inserting portions with engaging portions for receiving therein projecting pieces having engaging projections provided on the article while elastically expanding as the article is attached, and engaging the engaging projections of the projection pieces by rebounding the engaging portions at a position where receptions of the projecting pieces are terminated, each of said at least two clip members rotatably attached to the base pivoting in a direction crossing the surface of the base to align with the article to be attached when required and having a wobbling stopper pressed against the surface of the base in an elastically deformed state.

2. An article holder as claimed in claim 1, wherein each of said inserting portions includes a pair of holding parts for receiving therein the projecting piece with the engaging projection while elastically expanding as the article is set, said engaging portion being provided at at least one of the pair of holding parts for engaging the engaging projection of the projecting piece by rebounding of the holding part.

3. An article holder as claimed in claim 1, wherein said base is flexible.

4. An article holder for holding an article to a frame, comprising:
   a base in an elongated shape having an attaching surface on one side thereof to be attached to the frame and a rotation control portion; and
   at least two clip members rotatably attached to the base on a side opposite to the attaching surface of the base to have a space therebetween in a lengthwise direction thereof, each of said at least two clip members including inserting portions with engaging portions for receiving therein projecting pieces having engaging projections provided on the article while elastically expanding as the article is attached, and engaging the engaging projections of the projection pieces by rebounding the engaging portions at a position where receptions of the projecting pieces are terminated, each of said at least two clip members rotatably attached to the base pivoting in a direction crossing the surface of the base to align with the article to be attached when required, said rotation control portion controlling a rotation of the clip member by abutting against a part of the clip member when the clip member is rotated.

5. An article holder for holding an article to a frame, comprising:
   a base in an elongated shape having an attaching surface on one side thereof to be attached to the frame, a first hole for allowing a fixing device for the base to pass therethrough and a flange around the first hole, and
   at least two clip members rotatably attached to the base on a side opposite to the attaching surface of the base to have a space therebetween in a lengthwise direction thereof, each of said at least two clip members including inserting portions with engaging portions for receiving therein projecting pieces having engaging projections provided on the article while elastically expanding as the article is attached, and engaging the engaging projections of the projection pieces by rebounding the engaging portions at a position where receptions of the projecting pieces are terminated, each of said at least two clip members rotatably attached to the base pivoting in a direction crossing the surface of the base to align with the article to be attached when required and having a second hole between the inserting portions, said flange being located in the second hole to completely pass therethrough when the clip member is assembled with the base.

6. An article holder as claimed in claim 5, wherein said base includes a rib at one side thereof so that a movement of the clip member rotationally disposed on the flange is limited by the rib.

* * * * *